(12) United States Patent
Cigal et al.

(10) Patent No.: US 11,739,845 B2
(45) Date of Patent: Aug. 29, 2023

(54) CARBON FACE SEAL

(71) Applicant: Raytheon Technologies Corporation, Farmington, CT (US)

(72) Inventors: Brian P. Cigal, Windsor, CT (US); Christopher T. Anglin, Manchester, CT (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

(21) Appl. No.: 17/541,593

(22) Filed: Dec. 3, 2021

(65) Prior Publication Data
US 2023/0175589 A1 Jun. 8, 2023

(51) Int. Cl.
*F16J 15/34* (2006.01)

(52) U.S. Cl.
CPC ....... *F16J 15/3452* (2013.01); *F16J 15/3496* (2013.01)

(58) Field of Classification Search
CPC ... F16J 15/3452; F16J 15/3496; F16J 15/3464
See application file for complete search history.

(56) References Cited

U.S. PATENT DOCUMENTS

| | | | |
|---|---|---|---|
| 3,652,183 A | 3/1972 | Pottharst, Jr. | |
| 4,304,408 A | 12/1981 | Greenawalt | |
| 4,659,092 A * | 4/1987 | Wallace | F16J 15/3468 277/390 |
| 5,529,315 A * | 6/1996 | Borrino | F16J 15/004 277/927 |
| 5,556,110 A | 9/1996 | Marsi et al. | |
| 6,109,617 A | 8/2000 | Laney | |
| 6,152,452 A * | 11/2000 | Wang | F16J 15/3412 277/400 |
| 6,299,173 B1 * | 10/2001 | Lai | F16J 15/3472 277/352 |
| 7,780,399 B1 | 8/2010 | Garrison | |
| 11,125,333 B2 | 9/2021 | Nasman et al. | |

(Continued)

FOREIGN PATENT DOCUMENTS

CN 110285219 A 9/2019

OTHER PUBLICATIONS

European Search Report dated Mar. 31, 2023 for European Patent Application No. 22210042.2.

*Primary Examiner* — Gilbert Y Lee
(74) *Attorney, Agent, or Firm* — Bachman & LaPointe, P.C.

(57) ABSTRACT

An apparatus has: a first member; a shaft rotatable relative to the first member about an axis; and a seal system. The seal system has: a seal carried by the first member and having a seal face; a seal carrier; a seat carried by the shaft and having a seat face in sliding sealing engagement with the seal face; and one or more springs biasing the seal carrier relative to the first member so as to bias the seal face against the seat face. The seal carrier has: an axially-extending wall having an inner diameter (ID) surface; and a radially-extending wall having a first surface. The seal carrier axially-extending wall ID surface has a radially inwardly open groove having a first sidewall and a second sidewall and a base. A wave-form split ring contacts the first sidewall and biases the seal into engagement with the radial wall first surface.

25 Claims, 6 Drawing Sheets

(56) References Cited

U.S. PATENT DOCUMENTS

2004/0201176 A1\* 10/2004 Bjornson ............. F16J 15/3488
  277/370
2020/0386318 A1\* 12/2020 Nasman ................ F01D 11/003
2021/0332758 A1   10/2021 Nasman et al.

\* cited by examiner

CARBON FACE SEAL

BACKGROUND

The disclosure relates to gas turbine engines. More particularly, the disclosure relates to carbon seal systems.

Carbon seals are commonly used to seal between relatively rotating components in gas turbine engines (used in propulsion and power applications and broadly inclusive of turbojets, turboprops, turbofans, turboshafts, industrial gas turbines, and the like). These include shaft seals (i.e., where the sealing surfaces of seal and seat face radially (e.g., within 1.0° or essentially 0° and extend axially) and face seals (i.e., where the sealing surfaces face axially (e.g., within 1.0° or essentially 0° and extend radially).

In typical face seal situations, the annular carbon seal is axially spring biased into engagement with an annular seat (typically metallic such as a steel). Typical bias springs are bellows springs, coil springs (multiple circumferentially-distributed springs), or wave springs. The spring(s) act axially between a seal housing (seal support) and a seal carrier (carbon carrier) carrying the seal. An example seal carrier is a full annulus metal component carrying the seal and intervening between the seal and the spring. For example, a carrier may have: an outer sidewall surrounding a portion of the seal in interference fit; and a radial flange engaged by the spring (e.g., to which a bellows spring is welded). The sprung mass of such a seal includes the mass of the carbon ring, the carrier, and effectively half of the spring(s).

The seal may be a single-piece full annulus carbon member or may be segmented (formed by an end-to-end circumferential array of segments in arch bound relation via the carrier interference fit). U.S. Pat. No. 11,125,333 B2 (the '333 patent), of Nasman and Davis, issued Sep. 21, 2021, and entitled "Translating Fluid Coupling Device", discloses carbon seal having a secondary o-ring seal in an inner diameter (ID) rebate of the seal abutting a face of the seal carrier.

Often, the carbon seal is on non-rotating static structure and the seat rotates with one of the engine shafts. The sliding engagement causes frictional heating. The heat must be dissipated. With a rotating seat, it is common to use oil cooling. Generally, oil cooled carbon seals are divided into two categories: "dry face" seals wherein the oil passes through passageways in the seat without encountering the interface between seal face and seat face; and "wet face" seals wherein the oil passes through the seat to the interface so that the oil that flows through the seat cools the seat but then lubricates the interface to further reduce heat generation.

For both wet face and dry face seals, the oil may be delivered through a nozzle and slung radially outward by the rotating component and collected in a radially outwardly closed and inwardly open collection channel from which the passageways extend further radially outward.

SUMMARY

One aspect of the disclosure involves an apparatus comprising: a first member; a shaft rotatable relative to the first member about an axis; and a seal system. The seal system has: a seal carried by the first member and having a seal face; a seal carrier; a seat carried by the shaft and having a seat face in sliding sealing engagement with the seal face; and one or more springs biasing the seal carrier relative to the first member so as to bias the seal face against the seat face. The seal carrier has: an axially-extending wall having an inner diameter (ID) surface; and a radially-extending wall having a first surface. The seal carrier axially-extending wall ID surface has a radially inwardly open groove having a first sidewall and a second sidewall and a base. A wave-form split ring contacts the first sidewall and biases the seal into engagement with the radial wall first surface.

In a further embodiment of any of the foregoing embodiments, additionally and/or alternatively, the seal is in a radial interference fit with the seal carrier axially-extending wall ID surface.

In a further embodiment of any of the foregoing embodiments, additionally and/or alternatively, the radial interference fit provides a compressive stress in the seal of 10 MPa to 60 MPa.

In a further embodiment of any of the foregoing embodiments, additionally and/or alternatively, the wave-form split ring has a compressed wave amplitude of at least 2.5 millimeters.

In a further embodiment of any of the foregoing embodiments, additionally and/or alternatively, the wave-form split ring does not contact the second sidewall.

In a further embodiment of any of the foregoing embodiments, additionally and/or alternatively, the seal system further comprises: a sealing ring in an inwardly and axially open rebate in the seal and contacting the seal carrier radially-extending wall first surface.

In a further embodiment of any of the foregoing embodiments, additionally and/or alternatively, the sealing ring is a fluoroelastomer of four-lobed cross-section.

In a further embodiment of any of the foregoing embodiments, additionally and/or alternatively, the seal carrier comprises: an inner diameter sleeve having an outer diameter (OD) surface engaging the sealing ring.

In a further embodiment of any of the foregoing embodiments, additionally and/or alternatively, the inner diameter sleeve has an outer diameter surface with a proximal portion contacting the sealing ring and a distal portion tapering relative to the proximal portion.

In a further embodiment of any of the foregoing embodiments, additionally and/or alternatively, the seal has an inner diameter surface with a beveled transition to the rebate.

In a further embodiment of any of the foregoing embodiments, additionally and/or alternatively, the rebate has an outer diameter surface angled 5.0° to 20.0° off-axial.

In a further embodiment of any of the foregoing embodiments, additionally and/or alternatively, the rebate has a coating in contact with the sealing ring.

In a further embodiment of any of the foregoing embodiments, additionally and/or alternatively, the coating comprises aluminum oxide or PTFE.

In a further embodiment of any of the foregoing embodiments, additionally and/or alternatively, the seal is a carbon seal.

In a further embodiment of any of the foregoing embodiments, additionally and/or alternatively, the seat is steel.

In a further embodiment of any of the foregoing embodiments, additionally and/or alternatively, the seal is a single piece.

In a further embodiment of any of the foregoing embodiments, additionally and/or alternatively, the apparatus is a gas turbine engine.

In a further embodiment of any of the foregoing embodiments, additionally and/or alternatively, the seal system isolates a bearing compartment.

In a further embodiment of any of the foregoing embodiments, additionally and/or alternatively, in a method for manufacturing the apparatus the seal is assembled to the seal carrier by: heating the seal carrier to a temperature of 90° C. to 250° C.; and inserting the seal into the seal carrier.

In a further embodiment of any of the foregoing embodiments, additionally and/or alternatively, cooling of the seal carrier leaves a radial interference fit with a compressive stress in the seal of 10 MPa to 60 MPa.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
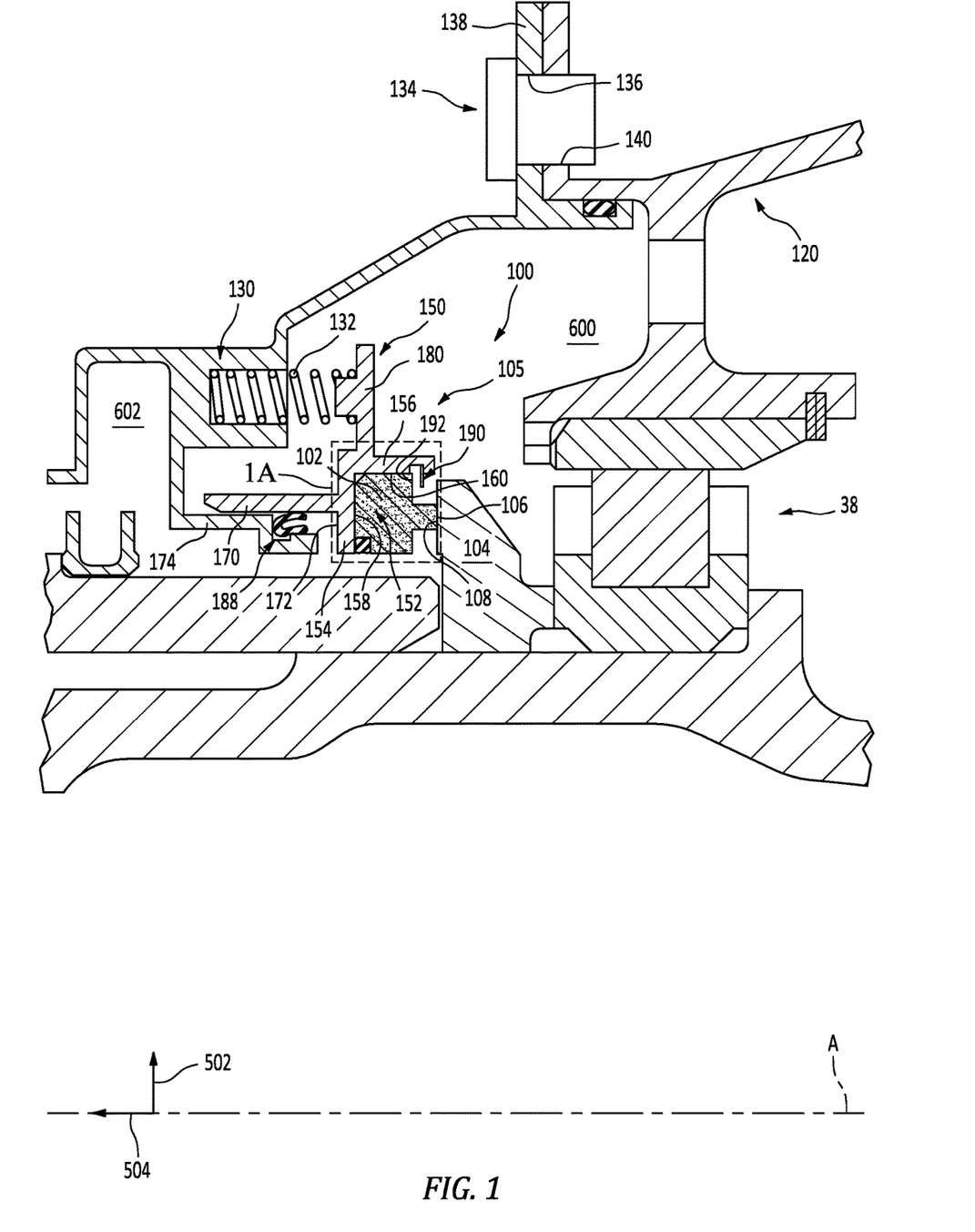
FIG. 1 is a first axial sectional view of a seal system in a turbomachine.

FIG. 1 shows a seal system 100 having a seal 102 and a seat 104 (seal plate). As is discussed further below, the seal system is used in a turbomachine such as a gas turbine engine for a purpose such as isolating a bearing compartment 600. The seal is mounted to a first structure such as an engine static structure and the seat is mounted to rotate relative thereto (e.g., mounted to a shaft) about an axis A which may be the engine centerline or central longitudinal axis. As discussed below, the example seal system includes the seat as one piece and the seal as part of a cartridge subassembly (cartridge) 105. FIG. 1 further shows an outward radial direction 502 and a forward direction 504.

Figure 1A:
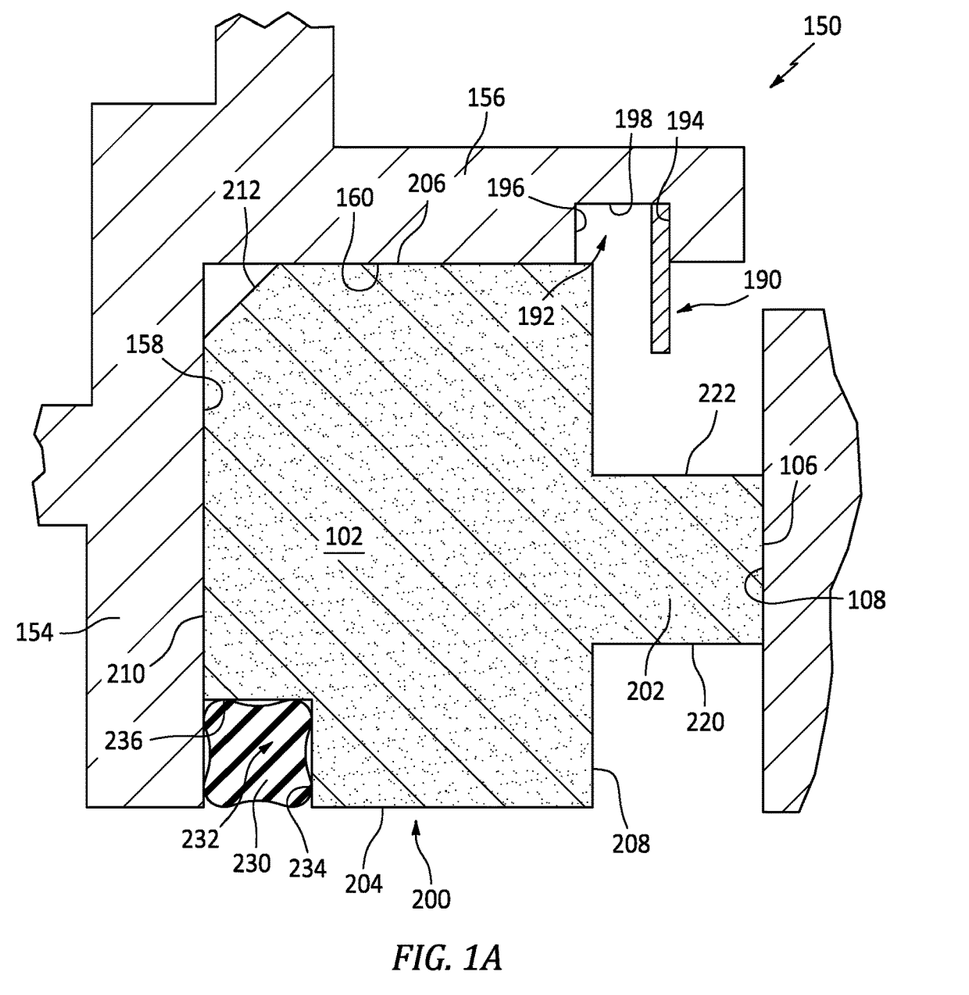
FIG. 1A is an enlarged view of the seal system of FIG. 1.

The example seal 102 is a carbon seal (carbon element) having an axially-facing/radially-extending seal surface or face 106 (FIG. 1A). The example seal 102 is formed as a single-piece body (monoblock) circumscribing a central axis normally coincident with the centerline A when installed.

The seat 104 has an axially-facing/radially-extending seat surface or face 108 engaging the seal face 106. The faces 106 and 108 are axially-facing/radially extending faces. This engagement may allow relative radial displacement of seal and seat.

Figure 4:
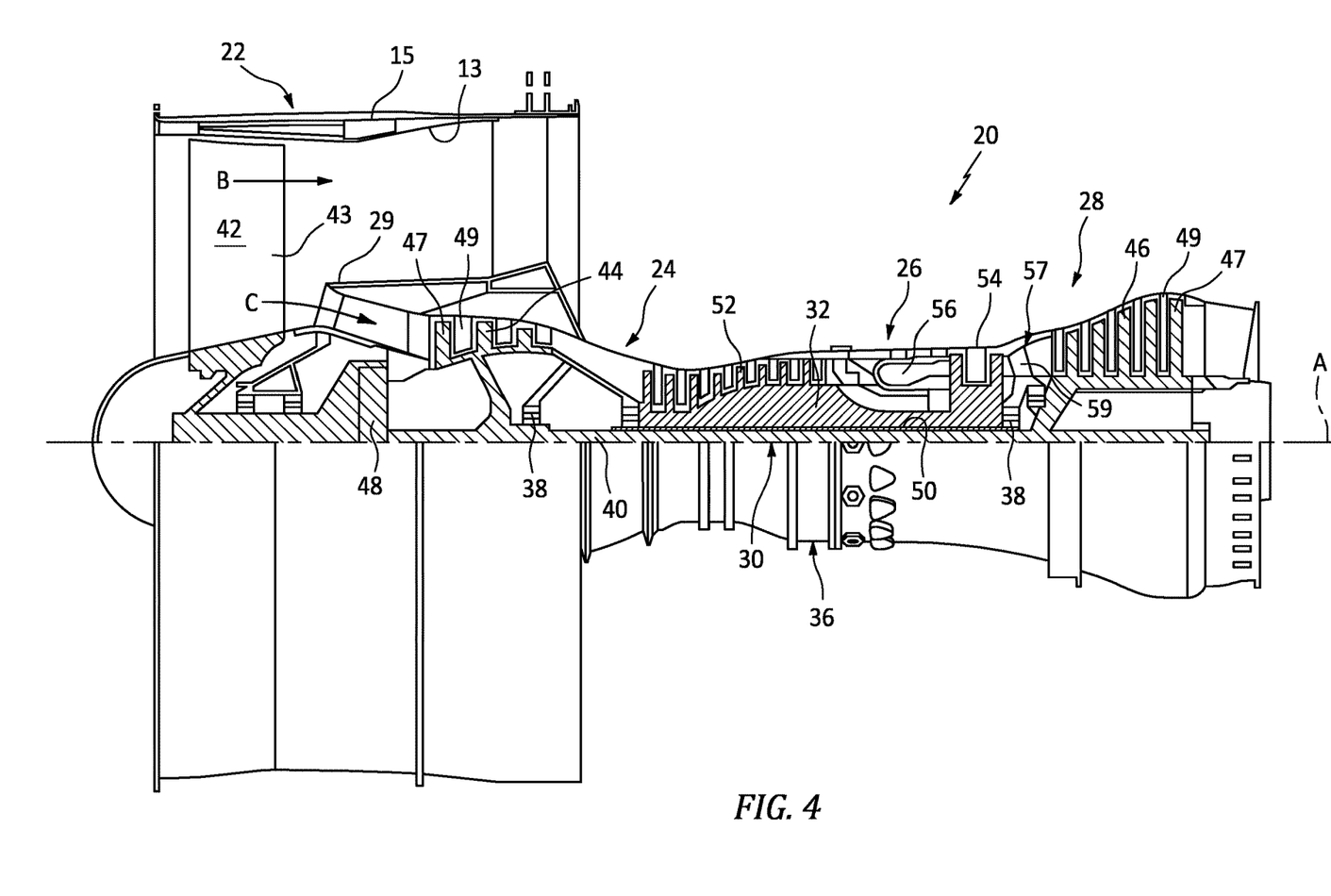
FIG. 4 is a schematic view of a gas turbine engine in which the seal system may be included.

The seal system 100 (FIG. 1) isolates a space or volume 600 from a space or volume 602. The example space or volume 600 is a bearing compartment. The example seal system is at a forward end of the bearing compartment. A similar or other seal system (not shown) may be at an aft end of the bearing compartment. The example bearing compartment 600 contains a bearing 38 supporting the shaft for rotation relative to the static structure about the axis A. The example second space or volume 602 is a buffer chamber. In the example engine configuration and position, a case component 120 (e.g., a strut ring/frame) of the static structure is positioned radially inboard of a gas path (core flowpath) C (FIG. 4). The example seal is a dry face uncooled seal. An alternative is an oil-cooled dry-face seal wherein an array of passageways (not shown) extend from respective inlet ports (not shown) at a plenum (between the seat and a portion of a shaft) through outlet ports (not shown) on the seat to an outer diameter (OD) rim for carrying oil. The seal may alternatively be a wet face seal in that there are oil passageways to outlets on the seat face 108.

The seal system further includes a seal housing (seal support) 130 and one or more bias springs 132 biasing the seal 102 into engagement with the seat 104 in the assembled engine. The housing 130 is mounted to the case component 120 such as via interference fit and/or fasteners. Example fasteners 134 (FIG. 1) are screws extending through apertures 136 in mounting ears 138 of the housing and then into threaded bores 140 of the case component 120 (or through the case component to engage nuts (not shown)). The example housing 130 is machined or cast/machined of an alloy.

FIG. 1 further shows the cartridge 105 as including a seal carrier (carbon carrier) 150 intervening between the seal 102 and the spring(s) 132. For forming a compartment (seal compartment) 152 for receiving the seal 102, the seal carrier has a radial wall 154 and an axial wall 156 extending axially from the radial wall 154. The radial wall 154 has, along the seal compartment 152, a face 158 (an aft face in the example or a forward face if oppositely oriented). The axial wall 156 has, along the seal compartment, a face 160 (an inner diameter (ID) face). The example seal carrier 150 is machined or cast/machined of an alloy.

The example seal carrier 150 also includes a centering wall 170 extending from a face 172 of the radial wall 154 axially opposite the face 158. The centering wall 170 serves to center the cartridge 105 relative to the housing 130 by closely encircling an adjacent wall 174 of the housing. The example seal carrier 150 further includes a second radial wall 180 extending outward from the wall 156. The radial wall 180 may function to interact with one or more anti-rotation torque pins 182 (FIG. 2) and a circumferentially arrayed plurality of bias coil springs 132 (FIG. 1). The bias coil springs (or other biasing means) and anti-rotation torque pins (or other anti-rotation means) may represent conventional features of a baseline seal system which may be further modified as discussed below. Similarly, the example system includes a secondary seal such as a PTFE C-seal 188. The example C-seal 188 is sandwiched radially between an inner diameter circumferential/axially-extending flange section of the housing and the inner diameter surface of a surrounding axially-extending circumferential flange of the seal carrier. An example C-seal is shown butting up against a radial wall of the housing flange and open to the chamber 602 so as to be pressure-energized. Other secondary seals are possible and no secondary seal at all is an alternative.

Figure 2:
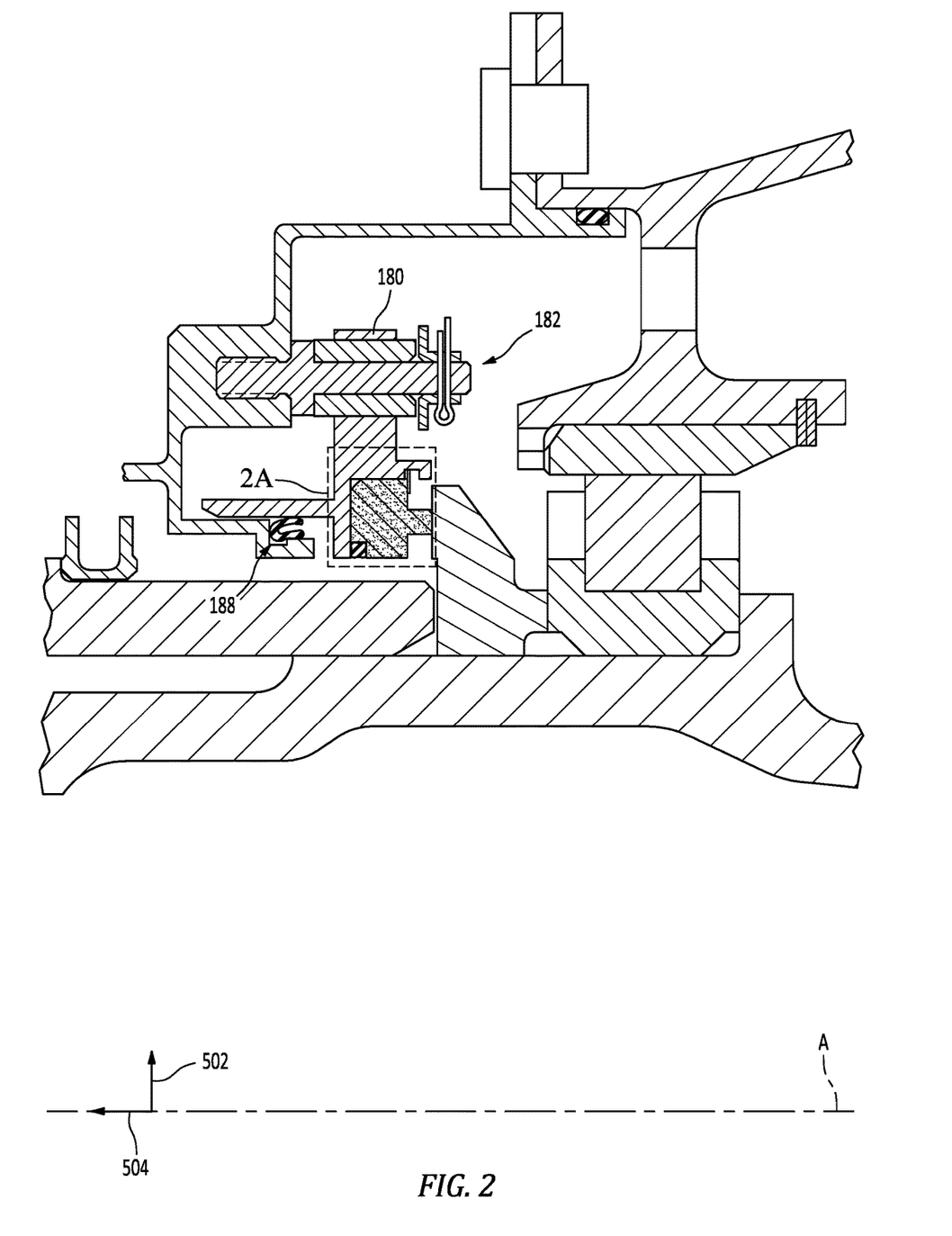
FIG. 2 is an axial sectional view of the seal system out of phase to the view of FIG. 1A about a wave-form split ring.

Discussed further below, the cartridge 105 further includes a wave-form split ring internal snap ring (aka wave ring) 190 (FIG. 1A) captured in a radially-inwardly open channel or groove 192 in the wall 156 to bias the seal 102 into engagement with the face 158. An example such snap ring is the WAVERING™ ring of Smalley Steel Ring Co., Lake Zurich, Illinois. For economy of illustration, the circumferential position of snap ring 190 to carrier 150 channel 192 sidewall contact and energizing coil spring 132 of FIG. 1 and snap ring 190 to seal 102 contact and anti-rotation pin 182 of FIG. 2 is chosen as convenient. Nevertheless, the angular position and number of cycles of the wave ring 190 may yield other contact locations.

Internal snap ring 190 and its mating carrier feature(s) (and other features discussed below) may be added in a reengineering from a baseline such as that discussed above. The FIG. 1 illustrated ring is a single-turn-non-overlap ring.

In such a non-overlap (lacking axial overlap) ring there is a circumferential gap between ends of the metal strip so that faces of the strip do not contact each other. However, the ends may be angled so that one end circumferentially overlaps at a different radius from the other and the gap is both circumferential and radial. Alternative rings are multi-turn rings (e.g., FIG. 5 discussed below) where there is axial overlap of multiple turns over a circumferential span (e.g., of about 360°).

FIG. 1A shows the groove 192 as having a first sidewall or face 194 (aft face in the example), a second sidewall or face 196 axially opposite thereto (forward face in the example), and an outer diameter base (base surface or face) 198. The snap ring 190 contacts the first sidewall 194. FIG. 1A shows such contact at one peak of the amplitude of the wave. At an opposite peak of the amplitude of the wave, FIG. 2 shows the spring contacting the seal 102 but still spaced apart from the sidewall 196. An example ring has at least two cycles about the axis A so as to have at least two contact locations at each axial end, more particularly at least three or an example four to twelve or six to twelve. Thus, at one axial end the contact locations of the peaks are with the sidewall/face 194; whereas at the other axial end the contact locations of the opposite peaks are with the seal.

The compressed wave amplitude (peak-to-peak, cross-section center to cross-section center) may be at least 2.5 millimeters, or an example 2.5 millimeters to 10.0 millimeters or 2.5 millimeters to 5.0 millimeters or 2.8 millimeters to 4.0 millimeters. The relaxed amplitude will be greater (e.g., at least 10% greater or an example 50% to 200% greater). An example relaxed amplitude is 4.0 millimeters to 10.0 millimeters or 3.8 millimeters to 15.0 millimeters.

Figure 5:
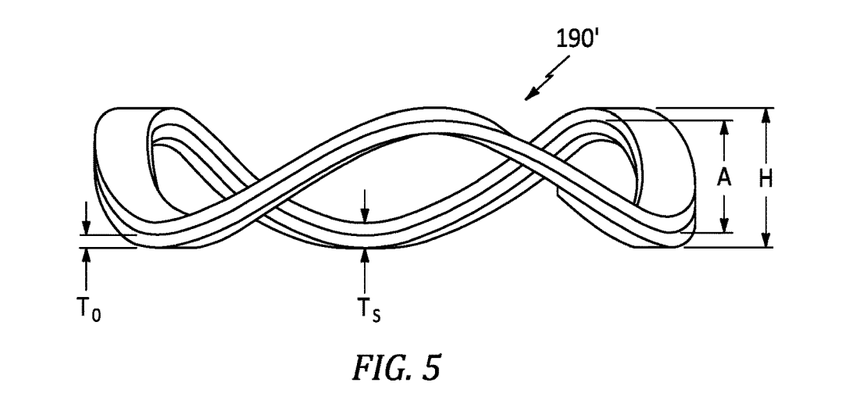
FIG. 5 is a side view of a two-turn internal snap ring.

FIG. 5 shows an example two-turn ring 190' where the material/turn thickness is shown as $T_O$, the ring thickness Ts is twice that, the ring is shown as height H, and the peak-to-peak wave amplitude A is H-Ts.

Figure 2A:
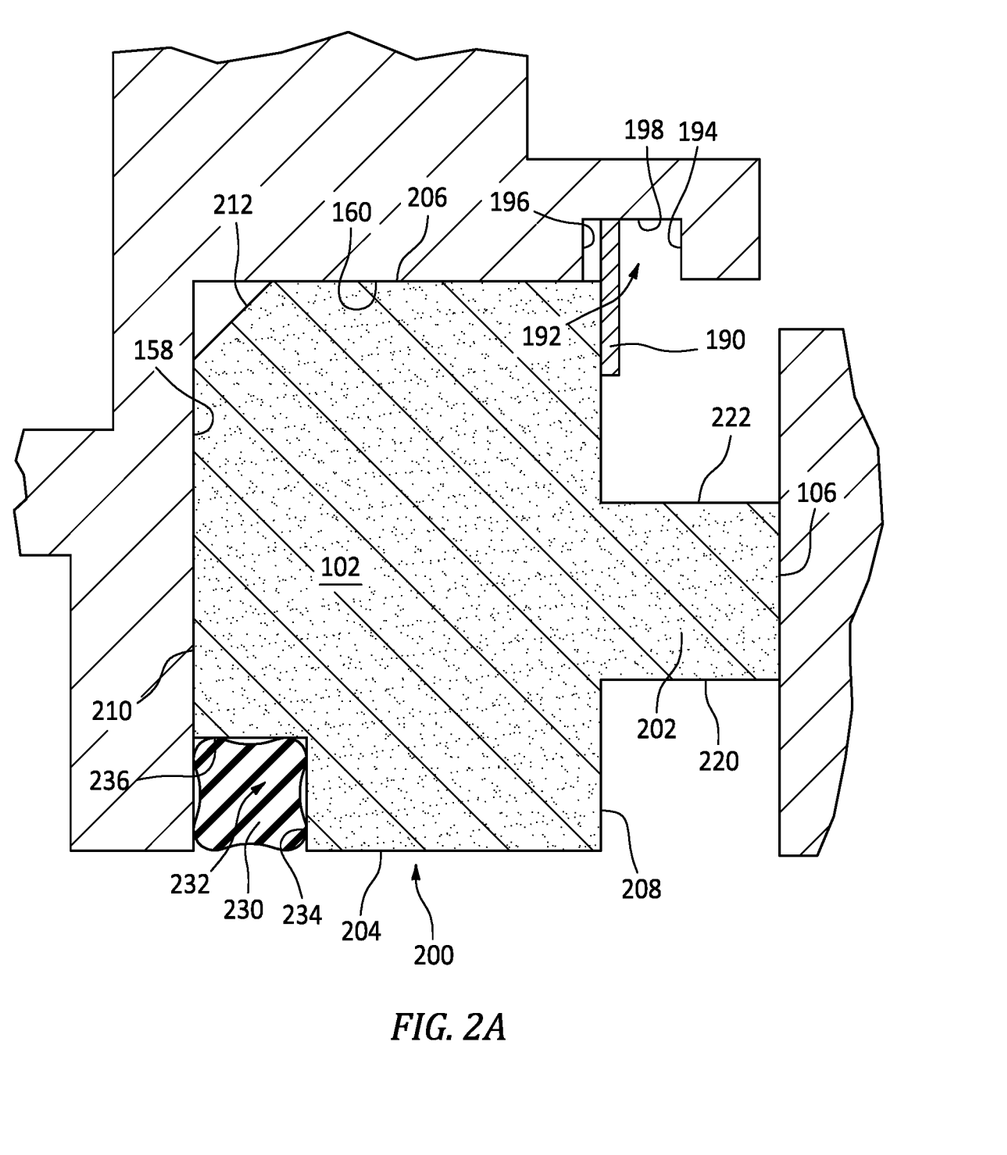
FIG. 2A is an enlarged view of the seal system of FIG. 2.

FIG. 1A shows the seal 102 as having a main body section 200 and a lip 202 protruding axially therefrom to the seal surface 106. The main body 200 has an inner diameter (ID) surface 204 and an outer diameter (OD) surface 206. The main body has a first end face 208 (aft in the example) and a second end face 210 (forward in the example). The forward end face 210 contacts the face 158. The surface 206 contacts the ID surface 160. In the example, a bevel surface 212 joins the surfaces 206 and 210. The lip 202 has an inner diameter (ID) surface 220 and an outer diameter (OD) surface 222 respectively radially recessed relative to the surfaces 204 and 206. The surface 222 is radially recessed to accommodate the ring 190. The ring 190 thus contacts a portion of the surface 208 (FIG. 2A) radially outboard of the surface 222.

The example cartridge 105 also includes a sealing ring 230 sealing between the seal 102 and the seal carrier 150. The example sealing ring 230 is an elastomeric ring (e.g., a four-lobed seal such as the Quad Ring sealing ring of Minnesota Rubber & Plastics—Quadion LLC, Minneapolis, Minn.). Example sealing ring material is a fluoroelastomer such as Viton™ fluoroelastomer of The Chemours Company, Wilmington Del. Sealing rings with alternative sections may be used or the sealing ring may be eliminated.

The example sealing ring 230 is accommodated in an inner diameter (ID) rebate 232 of the seal 102 at a junction of the surfaces 204 and 210. The example sealing ring 230 is in axial compression between the radial face 234 of the rebate and the carrier wall face 158. The rebate 232 also has an outer diameter (OD) face 236 (to the OD of the rebate but to the ID of the seal material). The rebate 232 or at least the radial face 234 contacting the sealing ring may bear a coating (not shown) that smooths texture and seals porosity of the carbon of the seal. An example coating is aluminum oxide applied via plasma spray to a thickness of 0.10 mm to 0.40 mm, then machined to a final thickness of 0.050 mm to 0.30 mm thick. Another example coating is polytetrafluoroethylene (PTFE) applied via an air-powered spray gun to a thickness 0.0025 mm to 0.025 mm thick and not requiring any post-finishing operations.

The example seal system may represent a modification or reengineering of a baseline seal or configuration thereof (lacking the wave-form split ring snap ring 190 and optionally lacking the sealing ring 230). The baseline may have a hard interference fit (e.g., press-fit and/or thermal interference fit) between the carbon seal and the seal carrier. A conventional split ring in a housing groove may serve merely as a backup retention mechanism. The hard interference fit may itself provide robust sealing between the seal and carrier. The modified or reengineered seal system or configuration may involve a much lighter interference fit which might be light enough to potentially be overcome by in-use vibration. Accordingly, to counter any backing out of the seal from the carrier, the wave form of the snap ring 190 biases the seal into its fully seated condition.

Additionally, the sealing ring 230, if present, helps seal against any air or oil infiltration. In an example situation, due to the higher pressure in the buffer chamber 602 such pressure will bias the sealing ring 230 outward to maintain its condition radially seated against the rebate surface 236.

Figure 3:
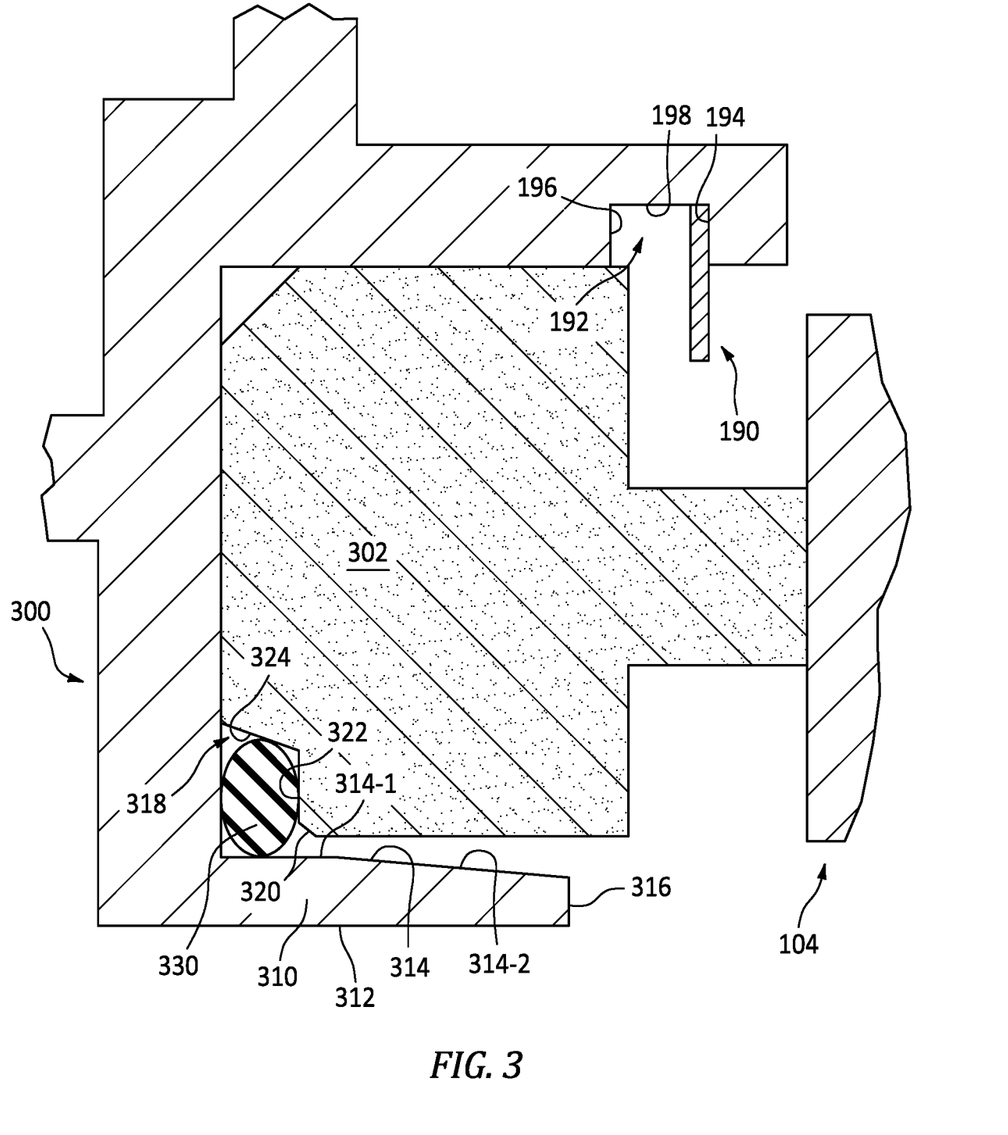
FIG. 3 is an enlarged axial sectional view of a second seal system.

An alternative embodiment of FIG. 3 adds an inner diameter (ID) wall 310 to the carrier 300. The carrier 300 and the seal 302 may be similar to the carrier 150 and seal 102 with further modifications discussed. Nevertheless, any physically appropriate combination of features may be interchanged between the illustrated or other embodiments. The ID wall 310 has an inner diameter (ID) surface 312, an outer diameter (OD) surface 314 and an aft/distal rim or end surface 316. The OD surface 314 radially captures the sealing ring 330 against the rebate OD surface 324. The example sealing ring 330 is schematically shown as a circular-sectioned O-ring (deformed by compression) rather than a lobed section. The sealing ring 330 may be an elastomer (e.g., fluoroelastomer). However, other ring sections may be used. The OD surface 314 includes a relatively axially-extending (e.g., circular cylindrical) proximal portion 314-1 and a radially inwardly tapering (toward the rim 316) distal portion 314-2. The example distal portion has an axial span at least 50% of an axial span of the proximal portion to provide a shallow lead in (e.g., 50% to 500% or 100% to 400%). The example FIG. 3 seal 302 rebate (compartment) 318 includes a bevel 320 between its main body ID face and rebate radial face 322. The rebate 318 also includes a tapering outer diameter (OD) surface 324 extending from the radial face to the adjacent end face. An example taper is 5.0° to 25.0° off-axial, more particularly 10.0° to 20.0° or about 15°.

The tapering of the surface 324 may avoid damaging the sealing ring during assembly. The bevel or chamfer 320 may avoid chipping of the seal 302 during assembly. The ID wall 310 may protect the sealing ring from radially-slung debris in the buffer chamber.

In one example of an assembly process, the seal carrier 150, 300 is preheated (e.g., by thermal convection in either an air oven or a liquid (e.g., water) bath.). Example heating is to a temperature of about 250° F. (121° C.), more broadly, 90° C. to 150° C. or 90° C. to 200° C. or 90° C. to 250° C. This may be in distinction to a baseline heating in the range of 280° C. to 340° C. (discussed further below).

The sealing ring 230 may then be located relative to the seal carrier. For the FIG. 3 seal carrier 300, this may involve locating by the ID wall 310 OD surface 314 at the root of the ID wall. For the FIG. 1A seal carrier 150, this may involve tool/fixture (not shown) with an OD surface similarly positioned to OD surface 314.

The seal 102 may be inserted to the seal carrier via translation (e.g., held by a tool (not shown)). The seal may then be held in its fully seated condition while the carrier is allowed to cool (e.g., in ambient or forced air) to a threshold temperature (e.g., approximately room temperature such as 20° C. to 22° C. or, more broadly 20° C. to 25° C.).

A subsequent pressure test of the assembly (seal 102 and seal carrier 150 and sealing ring 230 if present) may involve mounting the seal assembly into a fixture (not shown) which will allow establishing a pressure differential across the two boundaries between the sealing ring 230 and seal carrier 150, and the sealing ring 230 and seal 102. The pressure differential may be held at approximately 0.138 MPa for approximately two minutes, and the acceptance criteria will be judged by the leakage rate. An example acceptable leakage rate is about 0 MPa to 0.014 MPa per minute. Higher rates will be cause for reworking the assembly, such as by disassembly and reassembly, to achieve the acceptable leakage rate.

In one example of reengineering from a baseline seal system, an essentially pure press/interference fit of the baseline seal is replaced by a lighter interference fit plus the biasing action of the split ring. Seal construction may otherwise be preserved. This interference reduction may be achieved by a slight increase in the diameter of the seal carrier ID surface or by a slight decrease in the diameter of the seal OD surface. The reduced tensile hoop stress in the carrier will reduce chances of fatigue failure.

However, further advantages may be achieved and may have a cumulative effect and any particular embodiment may involve tradeoffs among the possible advantages. For example, the reduced interference fit reduces stresses in the seal. This may allow a reduction in the cross-sectional area of the seal due to not having to withstand the stresses at a given level of interference. This cross-sectional reduction reduces the weight of the seal.

Even with a hard interference fit, there may be a tendency for vibration to back the carbon seal out of the fully seated position in the carrier. Even with reduced interference fit, the wave-form snap ring biasing of the seal 102 may maintain the fully seated position or at least reduce excursion amplitudes relative to the hard interference fit alone. The wave-form snap ring allows more consistent (less variation of) sealing ring 230 squeeze due to biasing the seal 102 against the seal carrier 150 and constant spring-load keeping the seal 102 firmly seated in the carrier. In a reengineering relative to a baseline, this may allow using a smaller sealing ring 230 cross section, reducing sealing ring weight. This correspondingly reduces the carbon seal rebate size which, in turn, allows reduction in the carbon seal body cross section beyond the rebate for a given level of strength. All these thus provide a lighter cartridge.

For thermal interference fits, reduced interference may reduce the heating temperature and thus decreasing cycle time and energy used in heating. Similarly, reduced interference may be associated with reduced need for robustness of the seal carrier, allowing material removal from the seal carrier and, thereby, lightening of the seal carrier. Lightening of the seal carrier may have positive feedback by further reducing energy and cycle time for heating in the thermal interference fit.

Lightening of the seal and/or seal carrier and/or sealing ring also allows reduction in the needed bias force from the bias spring(s). This reduced bias force may be associated with reduced spring weight. However, the reduced biased force may have a number of other advantages. Reduced bias force will, all things being equal, reduce seal wear and heat generation. This may improve longevity.

As an example of temperature reduction for thermal interference fit, the baseline seal may use a heating temperature in the range of 280° C. to 340° C.; whereas the revised seal may use 90° C. to 150° C. or other ranges discussed above. The reduction may be of an example 190° C. to 220° C. or 100° C. to 220° C.

As an example of interference and stress reduction, the baseline seal may have an example compressive stress (e.g., at ambient conditions of 21° C. and 1.0 atm (1.0 Bar), more broadly 18° C. to 25° C. at 0.95 Bar to 1.05 Bar) of 18,500 psi (128 MPa), more broadly at least 75 MPa or 75 MPa to 150 MPa; whereas the revised seal may have an example such a stress of 5,735 psi (39.5 MPa), more broadly 10 MPa to 60 MPa or 20 MPa to 50 MPa. The reduction may be of an example 6,383 PSI (44 MPa) to 19,148 PSI (132 MPa).

Component materials and manufacture techniques and assembly techniques may be otherwise conventional. For example, there are numerous commercially available annular carbon seal blanks. Such a stock blank may be lathed to profile and may then have material milled and drilled away to reveal any non-annular features such as anti-rotation features (not shown). These commercial blanks are available in a variety of base carbon materials (e.g., carbon graphite and electrographite) with various impregnants (e.g., for strength/cohesion and/or lubricity) suitable for particular operating environments and conditions. Example material is at least 50% carbon by weight, more particularly, at least 90% or 95% or 99% or even commercially pure carbon with inevitable impurities.

Example seats may be machined from an appropriate metal alloy (e.g., a stainless steel). This may be via lathing of an annular blank to a basic profile and then milling and drilling departures from annular (e.g., mounting splines, ID oil channels, and the like if present).

The housing and seal carrier may be formed of an appropriate metal alloy (e.g., stainless steel or a titanium alloy) and may be formed such as by pure machining/drilling of a blank or by casting and finish machining.

The snap rings and sealing ring and spring(s) may be off-the-shelf commercial products.

FIG. 4 schematically illustrates a gas turbine engine 20 as one of many examples of an engine in which the seal system 100 may be used. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The example engine 20 generally includes a low speed spool 30 and a high speed spool 32 mounted for rotation about an engine central longitudinal axis A (forming the axis 500) relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the example gas turbine engine 20 is illustrated as a geared architecture 48 to drive the fan 42 at a lower speed than the low speed spool 30. The inner shaft 40 may interconnect the low pressure compressor (LPC) 44 and low pressure turbine (LPT) 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor (HPC) 52 and a second (or high) pressure turbine (HPT) 54. A combustor 56 is arranged in the example gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. An apparatus comprising:
    a first member;
    a shaft rotatable relative to the first member about an axis; and
    a seal system comprising:
        a seal carrier having:
            an axially-extending wall having an inner diameter (ID) surface; and
            a radially-extending wall having a first surface;
        a seal carried by the seal carrier and having a seal face;
        a seat carried by the shaft and having a seat face in sliding sealing engagement with the seal face; and
        one or more springs biasing the seal carrier relative to the first member so as to bias the seal face against the seat face,
    wherein:
        the seal carrier axially-extending wall ID surface has a radially inwardly open groove having a first sidewall and a second sidewall and a base; and
        the seal system further comprises a wave-form split ring contacting the first sidewall and biasing the seal into engagement with the radial wall first surface.

2. The apparatus of claim 1 wherein:
    the seal is in a radial interference fit with the seal carrier axially-extending wall ID surface.

3. The apparatus of claim 2 wherein:
    the radial interference fit provides a compressive stress in the seal of 10 MPa to 60 MPa.

4. The apparatus of claim 1 wherein:
    the wave-form split ring has a compressed wave amplitude of at least 2.5 millimeters.

5. The apparatus of claim 4 wherein:
    the wave-form split ring has a relaxed wave amplitude of 3.8 millimeters to 15.0 millimeters and 50% to 200% greater than the compressed wave amplitude.

6. The apparatus of claim 1 wherein:
    the wave-form split ring does not contact the second sidewall.

7. The apparatus of claim 1 wherein the seal system further comprises:
    a sealing ring in an inwardly and axially open rebate in the seal and contacting the seal carrier radially-extending wall first surface.

8. The apparatus of claim 7 wherein:
    the sealing ring is a fluoroelastomer of four-lobed cross-section.

9. The apparatus of claim 7 wherein the seal carrier comprises:
    an inner diameter sleeve having an outer diameter (OD) surface engaging the sealing ring.

10. The apparatus of claim 9 wherein:
    the inner diameter sleeve has an outer diameter surface with a proximal portion contacting the sealing ring and a distal portion tapering relative to the proximal portion.

11. The apparatus of claim 9 wherein:
the seal has an inner diameter surface with a beveled transition to the rebate.

12. The apparatus of claim 9 wherein:
the rebate has an outer diameter surface angled 5.0° to 20.0° off-axial.

13. The apparatus of claim 7 wherein:
the rebate has a coating in contact with the sealing ring.

14. The apparatus of claim 13 wherein:
the coating comprises aluminum oxide or PTFE.

15. The apparatus of claim 1 wherein:
the seal is a carbon seal.

16. The apparatus of claim 1 wherein:
the seat is steel.

17. The apparatus of claim 1 wherein:
the seal is a single piece.

18. The apparatus of claim 1 being a gas turbine engine.

19. The gas turbine engine of claim 18 wherein:
the seal system isolates a bearing compartment.

20. A method for manufacturing the apparatus of claim 1 wherein the seal is assembled to the seal carrier by:
heating the seal carrier to a temperature of 90° C. to 250° C.; and
inserting the seal into the seal carrier.

21. The method of claim 20 wherein:
cooling of the seal carrier leaves a radial interference fit with a compressive stress in the seal of 10 MPa to 60 MPa.

22. The apparatus of claim 1 wherein:
the wave-form split ring has four to twelve contact points at each axial end.

23. The apparatus of claim 1 wherein:
the wave-form split ring is a single-turn-non-overlap ring.

24. The apparatus of claim 1 wherein:
the wave-form split ring has a wave form with a plurality of first peaks contacting the first sidewall and a plurality of second peaks, opposite the first peaks contacting the seal.

25. The apparatus of claim 1 wherein:
the wave-form split ring has a compressed wave amplitude between the first sidewall and the seal; and
a relaxed wave form amplitude of the wave-form split ring is at least 10% greater than the compressed wave amplitude.

* * * * *